(12) United States Patent
Evgeny et al.

(10) Patent No.: US 11,698,299 B2
(45) Date of Patent: Jul. 11, 2023

(54) ULTRAVIOLET RADIATION SENSOR

(71) Applicant: Tower Semiconductor Ltd., Migdal Haemek (IL)

(72) Inventors: Pikhay Evgeny, Haifa (IL); Yakov Roizin, Afula (IL); Michael Yampolsky, Haifa (IL)

(73) Assignee: TOWER SEMICONDUCTOR LTD., Migdal-Haemek (IL)

( * ) Notice: Subject to any disclaimer, the term of this patent is extended or adjusted under 35 U.S.C. 154(b) by 146 days.

(21) Appl. No.: 17/444,560

(22) Filed: Aug. 5, 2021

(65) Prior Publication Data
US 2022/0026266 A1     Jan. 27, 2022

Related U.S. Application Data

(63) Continuation-in-part of application No. 16/947,004, filed on Jul. 14, 2020, now Pat. No. 11,543,290.

(51) Int. Cl.
*G01J 1/42* (2006.01)
*G01J 1/44* (2006.01)

(52) U.S. Cl.
CPC .............. *G01J 1/429* (2013.01); *G01J 1/44* (2013.01)

(58) Field of Classification Search
CPC ........ G01J 1/429; G01J 1/0407; G01J 1/4228; G01J 1/0488; H01L 27/1446; H01L 31/02019; H01L 31/02165; H01L 31/105; H01L 31/18
See application file for complete search history.

(56) References Cited

U.S. PATENT DOCUMENTS

| | | | |
|---|---|---|---|
| 9,370,600 B1* | 6/2016 | DuPuis | F21V 14/08 |
| 11,219,701 B1* | 1/2022 | Sahu | A61L 9/20 |
| 11,231,510 B1* | 1/2022 | Roizin | G01T 1/243 |
| 2019/0046812 A1* | 2/2019 | Harlan | A61C 19/004 |
| 2022/0026266 A1* | 1/2022 | Evgeny | G01J 1/429 |

* cited by examiner

*Primary Examiner* — David P Porta
*Assistant Examiner* — Meenakshi S Sahu
(74) *Attorney, Agent, or Firm* — Reches Patents

(57) ABSTRACT

A UV radiation sensor that includes an area that is filled with a dielectric material, the area comprises a first portion of a first thickness and a second trench portion with dielectric of a second thickness, wherein the first thickness is smaller than the second thickness; a floating gate that comprises a first floating gate portion that is positioned above the first area portion and a second floating gate portion that is positioned above the trench portion, wherein the second floating gate portion comprises multiple segments, wherein there are one or more gaps between two or more of the multiple segments; a charging element for charging the floating gate; and a readout element for reading the floating gate.

20 Claims, 4 Drawing Sheets

ULTRAVIOLET RADIATION SENSOR

CROSS REFERENCE

This application is a continuation in part (CIP) of U.S. patent application Ser. No. 16/947,004, filing date Jul. 14, 2020 titled "ULTRAVIOLET SENSOR AND A METHOD FOR SENSING ULTRAVIOLET RADIATION" which is incorporated herein by reference.

BACKGROUND OF THE INVENTION

Ultraviolet (UV) radiation sensors such are used in numerous applications, such as sterilization, solar radiation control, flame diagnostics, UV communications, etc.

Radiation sensors may be aimed to be integrated in various devices and systems.

There is a growing need to provide a UV radiation sensor that is highly sensitive. It may be beneficial to provide a UV radiation sensor that exhibits a low manufacturing cost. It may be further beneficial to provide a UV radiation sensor that exhibits a low power consumption.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
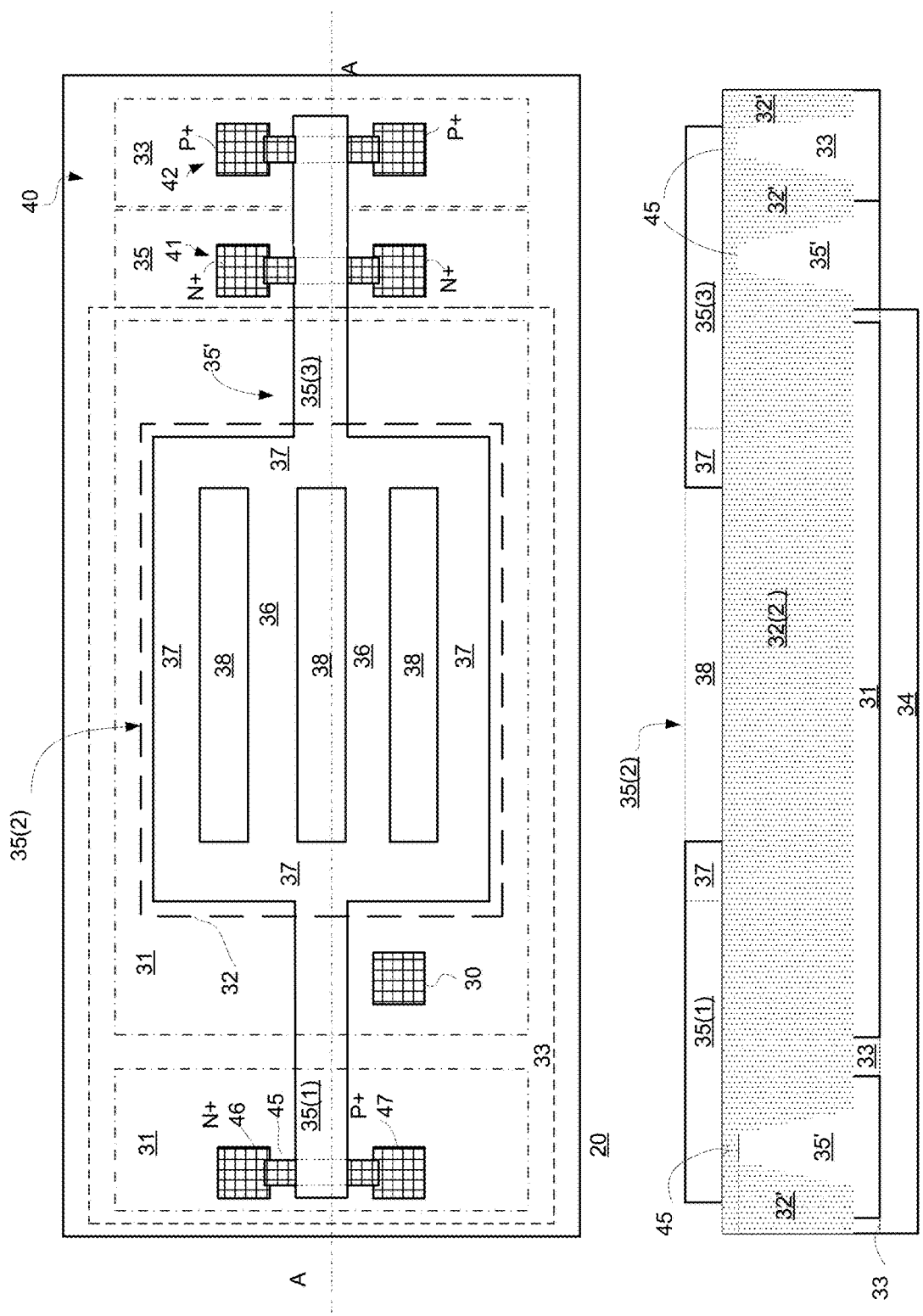
FIG. 1 is an example of a UV radiation sensor.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DESCRIPTION OF THE PREFERRED EMBODIMENTS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

There are provided UV radiation sensors and methods for sensing UV radiation.

The UV radiation sensor is highly sensitive. The high sensitivity may be provided due to the structure of the sensor. For example—the high sensitivity may be contributed, at least in part, to the shape of its floating gate, to a presence of a thick (for example between 500 and 10000 Angstrom) dielectric layer below a certain portion of the floating gate, and to a presence of a thin dielectric layer below another portion of the floating gate (70 and 150 A)

The thick dielectric layer allows to increase an area of a sensing capacitor that includes the thick dielectric layer—thus exposing the sensing capacitor to a larger number of UV photons while keeping low capacitance (smaller number of electrons in the floating gate charged to a given potential).

Regarding the shape of the floating gate—it includes a second portion that is formed from multiple segments that define one or more gaps between them. For example—the second portion may have a "grilled" shape that includes a rectangular frame (formed by external segments) and internal segments that stretch from one face of the rectangular frame to an opposite facet of the frame. Other shapes may be provided.

The high sensitivity may also be provided due to the formation of one or more sequences of photodiodes on one or more segments of the certain portion of the floating gate.

The UV radiation sensor may be CMOS compliant and may (a) exhibit a low energy consumption, (b) be of low cost of production. For example—avoiding using energy consuming MOSFET transistors, and avoiding costly PVD diodes reduce the cost and energy consumption of the UV radiation sensor.

It is beneficial to use relatively small bias voltages (for example up to five volts) to introduce a larger voltage difference between different parts of the UV radiation sensor. This may eliminate the need to use high-voltage CMOS components. This may be achieved by having independently biased tunneling and control gates. The lack of high-voltage CMOS components—and the usage of standard CMOS components reduces the cost and complexity of the UV radiation sensor. The different biasing voltages also facilitate a precisely controllable charge injection at both polarities.

Figure 2:
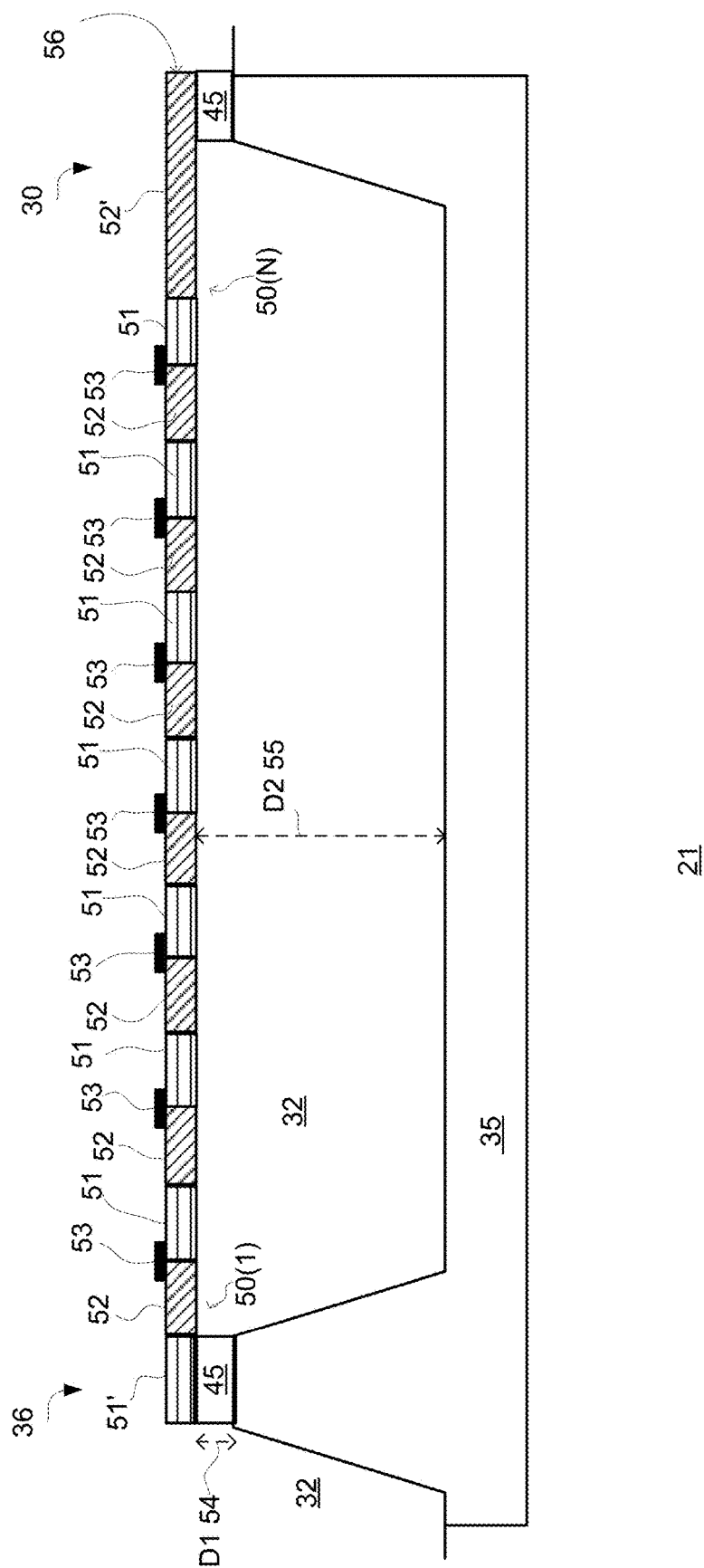
FIG. 2 is an example of a UV radiation sensor.
Figure 3:
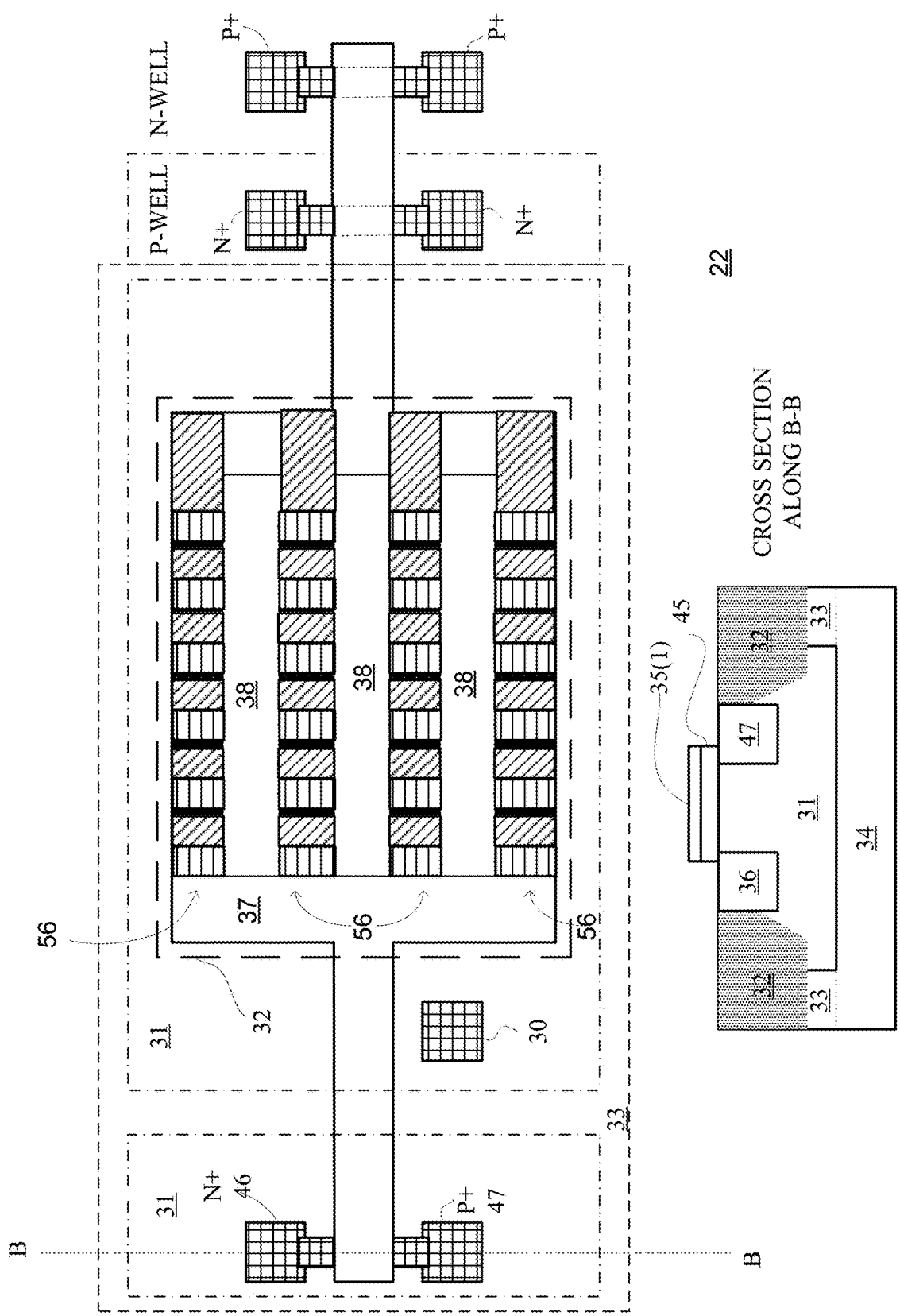
FIG. 3 is an example of a UV radiation sensor.

FIGS. 1-3 illustrate examples of UV radiation sensors 20, 21 and 22.

FIG. 1 illustrates an example of a UV radiation sensor 20. The top part of FIG. 1 provides a top view of the UV radiation sensor while the bottom part of FIG. 1 is a cross sectional view along longitudinal axis A-A.

The UV radiation sensor 20 may include a—an area with a dielectric material 32. The area includes a first portion (also referred to as gate oxide) 45 of a first thickness D1 54 and a second portion 32(2) that is a trench of depth D2 55. The first portion thickness is smaller than the second thickness (trench depth)—for example by a factor of 5, 10, 15 and even more.

The second thickness may ranges between 500 Angstrom and 10000 Angstrom.

The first depth may range between 70 to 150 Angstrom.

The UV radiation sensor also includes a floating gate 35 that may include a first floating gate portion 35(1) that is positioned above the first portion 45, and a second floating gate portion 35(2) that is positioned above the second portion of the area with the dielectric material. 32(2), wherein the second floating gate portion includes multiple segments (for example external segments 37 and internal segments 36), wherein there are one or more gaps 38 between two or more of the multiple segments.

FIG. 1 illustrates a second portion that has the "grilled" shape that includes a rectangular frame (formed by external segments 37) and internal segments 36 that stretch from one face of the rectangular frame to an opposite facet of the frame—and are parallel to the first and third portions of the floating gate.

The UV radiation sensor may also include charging elements for charging the floating gate—such as independently biased control gate 30 and tunneling gate 36' that is illustrated as including tunneling gate—P+ part 46 and tunneling gate—N+ part 47.

The UV radiation sensor also includes a readout circuit 40 for reading the floating gate.

In FIG. 1 the readout circuit 40 includes NMOS transistor 41 and PMOS transistor 42. The NMOS transistor 41 may be connected to the PMOS transistor 42 in various manners—for example—by forming an inverter. Alternatively—the NMOS and the PMOS transistors may be coupled in parallel—and when only one is activated at a time—only that activated transistor forms the readout circuit.

The tunneling gates are formed within a P-well 35'—having N-well 33 and dielectric from both sides and deep N-well 34 below.

The NMOS transistor 41 is formed within a P-well 35' and the PMOS transistor is formed within N-well 33. Dielectric isolation (trench filled with dielectric) is also formed at the top between the P-well 35' and the N-well 33, between the NMOS transistor and the left part of the third portion of the floating gate, and between the tunneling gate and the right part of the first portion of the floating gate.

FIG. 2 is an example of a UV radiation sensor 21 that includes a sequence of serially connected photodiodes 50(1)-50(K), each includes an anode and a cathode. The cathode of the first photodiode is denoted 51' while other cathodes are denoted 51. The anode of the last photodiode is denoted 52' while other anodes are denoted 52. One diode is shorted to another diode by a conductor (for example silicide) 53.

The cathode 51' of the first photodiode is much smaller (along the longitudinal axis of the sequence of the serially connected photodiodes) than the anode 52' of the last photodiode. The ratio may be, for example between 10 to 100

The cathode 51' of the first photodiode and a small part (for example—from 100 to 1000 Angstrom) of the anode 52' of the last photodiode are spaced apart from a lower semiconductor region—such as P-well 35 (may also be an N-well) by a thin dielectric segment (for example—having a thickness that equals the first distance D1 54) while at least a majority of the other photodiodes are spaced apart from the lower semiconductor layer by a much thicker dielectric (for example—having a thickness that equals the second distance D2 55).

The cathode 51' of the first photodiode at the thin dielectric and the part of the semiconductor layer that is immediately below the cathode 51' form a first capacitor of a first capacitance. A majority of the anode 52' of the last photodiode, the thick dielectric and the part of the lower semiconductor layer that is immediately below the majority of the anode 52' form a second capacitor of a second capacitance that well exceeds the first capacitance. Due to the difference in capacitance—and following an exposure of the sequence of serially connected photodiodes 50(1)-50(K) to UV radiation and a formation of a voltage drop on the sequence (due to the UV radiation)—and most of the voltage drop falls on the first capacitor—causing a charging or discharging the sequence of the FG comprising photodiodes, depending on photodiodes polarity.

Regarding the control of the UV radiation—the tunneling and control gates are actually shorted in FIG. 2, while read-out devices are not present. This embodiment demonstrates the idea of charge injection into the floating gate using the array of diodes in the floating gate itself.

FIG. 3 is an example of a UV radiation sensor 22 that includes a sequence of serially connected photodiodes 50(1)-50(K) on external segments and internal segments of the second portion of the floating gate that are parallel to the longitudinal axis of the floating gate.

The top part of FIG. 3 provides a top view of the UV radiation sensor while the bottom part of the UV radiation sensor provides a cross sectional view along travers axis B-B.

The UV radiation sensor 22 is even more sensitive to UV radiation that UV radiation sensor 20—and uses Fowler-Nordheim mechanism for enhancing the UV sensitivity. The voltage provided by the serially connected diodes provide injection of charges of the polarity opposite to charges in the floating gate. For example, the floating gate is charged with electrons. Discharging under UV radiation has two different mechanisms: one standard, due to photons absorbed at the edges of floating gate segments, and the second-connected with injection of electrons from the floating gate (or injection of holes from semiconductor layer under the floating gate) by the field generated by the photodiodes (Fowler-Nordheim injection).

Poly serial connection of photodiodes is to some extent sensitive to visible light, not only to UV radiation. If, for example, there is a need to operate in conditions when there is a large intensity of visible light in parallel with weak UV light, then there is a need to compensate the influence of visible light on the measurement results of the UV radiation sensor.

When there are two or more UV radiation sensors with different numbers of photodiodes (formed on segments of the floating gates) and/or two or more sensors that exhibit floating gates second portions with different floating gate peripheries—even when manufactured by the same manufacturing process, they exhibit a different sensitivity to UV and visible light—and output signals from such UV radiation sensors may be processed to distinguish the influence of UV and visible light and introduce a correction connected to sensitivity to visible light. The influence of F-N discharge and discharge There may be provided a device that may include one or more UV radiation sensors—for example any UV radiation sensor illustrated in the application.

The multiple UV radiation sensors are identical to each other.

The at least one UV radiation sensor of the multiple UV radiation sensor differs from at least one other UV radiation sensor by at least one parameter.

The at least one parameter may include a shape of the floating gate.

The at least one parameter may include a size of the floating gate.

The at least one parameter may include a peripheries parameter related to one or more peripheries of the floating gate.

The at least one parameter may include related to one or more sequences of serially coupled photodiodes formed on one or more segments.

The at least one parameter may include a number of serially coupled photodiodes.

The at least one parameter may include a sensitivity to visible light.

The at least one parameter may include relationship between sensitivity to visible light and sensitivity to UV radiation.

Figure 4:
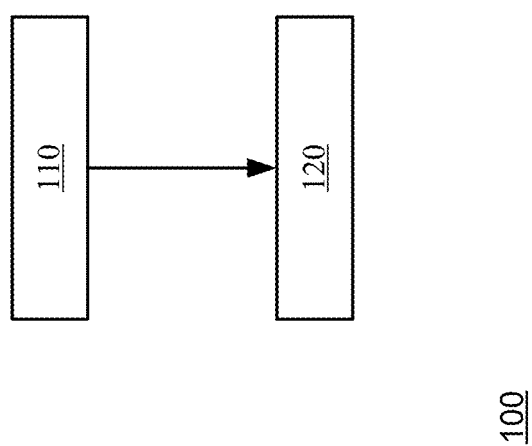
FIG. 4 is an example of a method.

FIG. 4 illustrates an example of a method. The method may include utilizing any of the mentioned above UV radiation sensors for sensing UV radiation.

Method 100 is for sensing UV radiation and may include steps 110 and 120.

Step 110 may include illuminating one or more UV radiation sensors with UV radiation.

Step 110 may be followed by step 120 of sensing the UV radiation by the one or more UV radiation sensors.

A UV radiation sensor of the one or more UV radiation sensors may include an area that is filled with a dielectric material, a floating gate, a charging element and a readout element.

The area may include a first portion of a first thickness and a second trench portion filled with dielectric of a second thickness. The first thickness is smaller than the second thickness.

The floating gate may include a first floating gate portion that is positioned above the first area portion and a second floating gate portion that is positioned above the second area portion.

The second floating gate portion may include multiple segments. There are one or more gaps between two or more of the multiple segments.

The charging element may be configured to charge the floating gate.

The readout element may be configured to read the floating gate.

Any reference to any of the terms "comprise", "comprises", "comprising" "including", "may include" and "includes" may be applied to any of the terms "consists", "consisting", "consisting essentially of". For example—any of the rectifying circuits illustrated in any figure may include more components that those illustrated in the figure, only the components illustrated in the figure or substantially only the components illustrated in the figure.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A UV radiation sensor, comprising:
an area that is filled with a dielectric material, the area comprises a first portion of a first thickness and a second trench portion with dielectric of a second thickness, wherein the first thickness is smaller than the second thickness;
a floating gate that comprises a first floating gate portion that is positioned above the first area portion and a second floating gate portion that is positioned above the trench portion, wherein the second floating gate portion comprises multiple segments, wherein there are one or more gaps between two or more of the multiple segments;

a charging element for charging the floating gate; and a readout element for reading the floating gate.

2. The UV radiation sensor according to claim 1 wherein the multiple segments comprise exterior segments and internal segments.

3. The UV radiation sensor according to claim 2 wherein the exterior segments form an external frame and the internal segments are positioned within the external frame.

4. The UV radiation sensor according to claim 3 wherein at least one internal segment extends from one external segment to another external segment.

5. The UV radiation sensor according to claim 4 wherein the at least one internal segment are normal to the one external segment and to the other external segment.

6. The UV radiation sensor according to claim 1 wherein the second thickness ranges between 500 Angstrom and 10000 Angstrom.

7. The UV radiation sensor according to claim 1 wherein the first thickness ranges between 70 Angstrom and 150 Angstrom.

8. The UV radiation sensor according to claim 1 wherein a segment of the multiple segments comprises a sequence of serially coupled photodiodes.

9. The UV radiation sensor according to claim 8 wherein the serially coupled photodiodes are coupled to each other by silicide.

10. The UV radiation sensor according to claim 8 wherein the serially coupled photodiodes comprises a first photodiode and a last photodiode, wherein a cathode of the first photodiode is narrower than an anode of the last photocathode.

11. The UV radiation sensor according to claim 10 wherein the cathode of the first photodiode is narrower by a factor of at least five than the anode of the last photocathode.

12. The UV radiation sensor according to claim 1 comprising a control gate and a tunneling gate that are independently fed by control signals.

13. The UV radiation sensor according to claim 1 wherein the readout element comprises at least one out of a PMOS transistor and an NMOS transistor.

14. A device comprising multiple UV radiation sensors; wherein each UV radiation sensor comprises an area that is filled with a dielectric material, the area comprises a first portion of a first thickness and a second trench portion with dielectric of a second thickness, wherein the first thickness is smaller than the second thickness; a floating gate that comprises a first floating gate portion that is positioned above the first area portion and a second floating gate portion that is positioned above the trench portion, wherein the second floating gate portion comprises multiple segments, wherein there are one or more gaps between two or more of the multiple segments; a charging element for charging the floating gate; and a readout element for reading the floating gate.

15. The device according to claim 14 wherein the multiple UV radiation sensors are identical to each other.

16. The device according to claim 14 wherein at least one UV radiation sensor of the multiple UV radiation sensor differs from at least one other UV radiation sensor by at least one parameter.

17. The device according to claim 16 wherein the at least one parameter comprises a shape of the floating gate.

18. The device according to claim 16 wherein the at least one parameter comprises a size of the floating gate.

19. The device according to claim 16 wherein the at least one parameter comprises a peripheries parameter related to one or more peripheries of the floating gate.

20. A method for sensing UV radiation, the method comprises: illuminating one or more UV radiation sensors with UV radiation; and sensing the UV radiation by the one or more UV radiation sensors; wherein each of the one or more UV radiation sensors comprises an area that is filled with a dielectric material, the area comprises a first portion of a first thickness and a second trench portion filled with dielectric of a second thickness, wherein the first thickness is smaller than the second thickness; a floating gate that comprises a first floating gate portion that is positioned above the first area portion and a second floating gate portion that is positioned above the second area portion, wherein the second floating gate portion comprises multiple segments, wherein there are one or more gaps between two or more of the multiple segments; a charging element for charging the floating gate; and a readout element for reading the floating gate.

* * * * *